Jan. 3, 1956  H. G. HENRICKSON  2,729,320
CENTRIFUGAL CLUTCH
Filed June 4, 1954
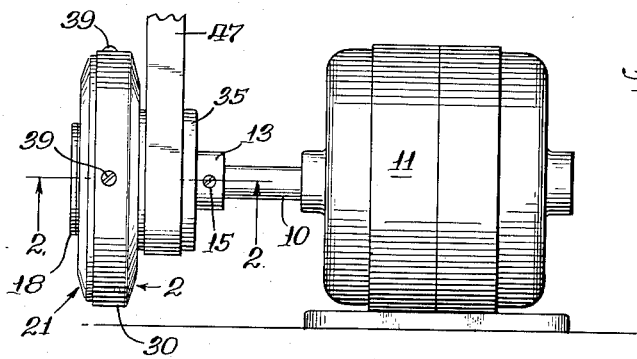
Fig.1.
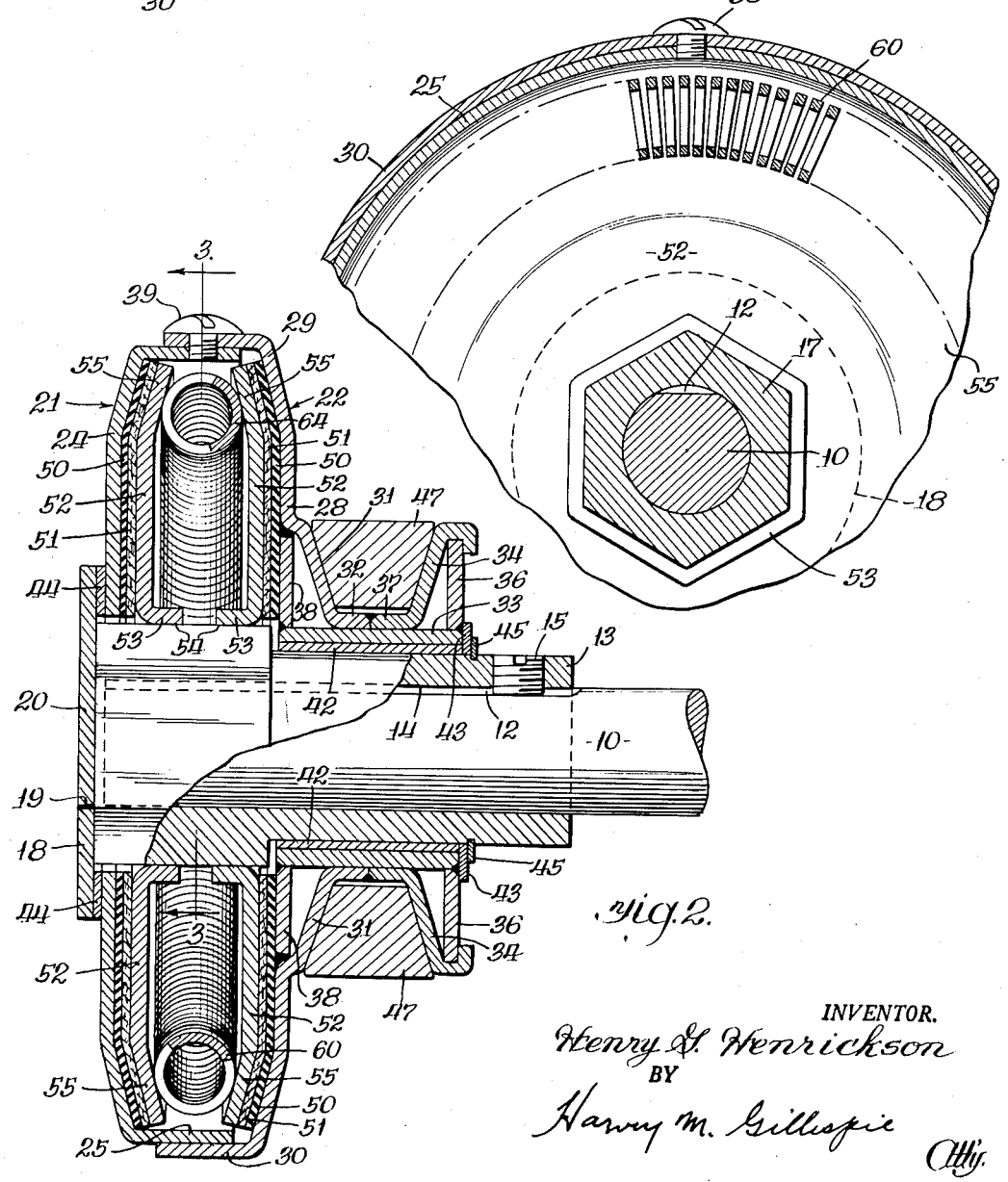
Fig.3.
Fig.2.
INVENTOR.
Henry G. Henrickson
BY
Harry M. Gillespie
Atty.

United States Patent Office 2,729,320
Patented Jan. 3, 1956

2,729,320

CENTRIFUGAL CLUTCH

Henry G. Henrickson, Des Plaines, Ill., assignor to Gateway Engineering Company, Chicago, Ill., a corporation of Illinois Application June 4, 1954, Serial No. 434,536

9 Claims. (Cl. 192—105)

The present invention relates to improvements in a centrifugal clutch designed primarily for use as a power take-off from power sources which have relatively low torque at starting speeds and must necessarily acquire a high speed of operation before they are capable of developing maximum power.

The improved clutch is shown and described herein as a power take-off for an electric motor of the fractional horsepower type now in general use as a power source for household appliances, including laundry equipment such as washers, rotary driers, etc. However, the invention is not necessarily restricted to such specified uses and may be employed in any situation where an efficient, light weight and low cost clutch mechanism is desired.

The objects of the invention are varied and manifold and principal among them is the provision of a clutch provided with a pair of opposed clutch plates and having converging clutch faces between which a free floating weight mass extends uniformly around the clutch mechanism and is movable by centrifugal force, upon acceleration of the clutch, into frictional wedging engagement with the opposed converging faces of said friction plates. In this connection the invention contemplates the use, as a weight mass, of a continuous helical spring made of closely wound relatively heavy wire of rectangular cross section, as distinguished from cylindrical wire, and thereby give maximum effective centrifugal mass with a minimum of occupied space, as well as extreme flexibility, high retractive power during clutch deceleration and uniformity of operation.

Another and equally important object of the invention is to provide a clutch in which the opposed friction plates employed therein are supported in opposed relationship at opposite sides of a clutch housing so that the thrust forces involved are exerted against the opposed inner faces of the housing and are therefore balanced out so as to render it unnecessary to provide thrust bearings.

A further object of the invention, in a clutch of this character, is to provide improved cushioning means between the clutch plates and the side walls of the housing whereby the cushioning means will better conform to the clutching faces of the friction plates and the walls of the housing and thereby provide stronger frictional contact therewith.

Still another object is to provide a clutch of the character outlined above in which the clutch housing is integrally formed and in which these parts may be fabricated from comparatively light but strong and durable sheet metal, thus contributing toward a reduction in weight of the clutch assembly as a whole.

Yet another object is to provide a clutch of this sort having clutch plates mounted on a driving member or quill having a retainer or end plate formed with a knock-out plug whereby the removal of the plug provides an opening in the quill in alignment with the central clutch shaft opening so that the clutch may be reversed upon the clutch driving shaft to obtain reversal in the direction of rotation of the clutch driving pulley.

Further features in matter of production and development of the present invention includes the provision of a clutch assembly which is rugged and durable and which therefore is possessed of an extremely long life; one which is comprised of a minimum number of moving parts and which therefore is unlikely to get out of order; one which is extremely compact in its design; one which may readily be assembled and dismantled for purposes of inspection, replacement or repair; and one which otherwise is well adapted to serve the purposes required.

In the accompanying drawings forming a part of this specification, a preferred embodiment of the invention has been shown.

In these drawings:

Fig. 1 is a side elevational view of a clutch construction in accordance with the principles of the present invention showing the same, for purpose of illustration and not as a limitation, operatively installed upon the drive shaft of an electric motor;

Fig. 2 is an enlarged sectional view taken substantially along the line 2—2 of Fig. 1; and Fig. 3 is a sectional view taken substantially along the line 3—3 of Fig. 2.

Referring now to the drawings in detail, the clutch assembly of the present invention is shown in Fig. 1 as being operatively mounted on the drive shaft 10 of a conventional electric motor 11, the shaft being formed with the usual flat portion 12 along its outer extremity. The clutch assembly involves in its general organization a central sleeve or quill 13 having a cylindrical bore 14 formed therein into which the shaft 10 extends and in which it is anchored by means of a set screw 15 which engages the flat surface 12 of the shaft 10. The quill 13 is provided with a cylindrical surface 16 and the left-hand end thereof, as viewed in Fig. 3, is formed with an hexagonal enlargement 17. The butt end of the quill 13 includes an end plate 18 in which there is cut a central opening 19 having a knock out plug 20 contained therein, the function of which will be made clear presently.

Telescopically received over the quill 13 is a two part separable housing assembly including a single part 21 and a complementary part 22 consisting of several sections suitably welded together as indicated. The housing part 21 is a dish-shaped member having a radial wall 23 provided with an inwardly inclined portion 24 and a laterally turned rim 25. The housing part 21 is formed with a central opening 26 therein which is somewhat larger than the overall diameter of the quill 13 so that a slight clearance exists between these two members to allow for relative rotation therebetween.

The composite housing part 22 includes a dish-shaped section 27 providing a radial wall 28 having an inwardly inclined portion 29 which converges toward the inclined portion 24 of the part 21, a laterally turned rim 30 and an offset angular hub portion 31 the inner rim of which is turned outwardly as at 32 and bears against a central tubular extension or hub proper 33. An outer ring-like section 34 is formed with an over-turned bead 35 and a circular piece 36 extends between the bead 35 and hub 33. The piece 34 has an inner laterally turned rim 37 which abuts the inner rim 32 of the hub part 31. A circular part 38 in alignment with the radial wall 28 extends between the dish-shaped member 27 and the hub proper and completes the composite housing part 22. Suitable fastening screws 39 serve to retain the housing parts 21 and 22 assembled.

The housing assembly 21 is rotatably mounted on the cylindrical surface of the quill 13 by means of a bushing bearing 42 made of nylon and interposed between the quill and housing hub 35. Thrust washers 43 and 44 respectively are disposed on opposite sides of the housing, the washer 43 being held in position by a snap ring 45 and the washer 44 being secured by means of the housing end plate 18.

The hub part 33 of the dish-shaped part 30 of the housing section 24, in combination with the outer piece 36, provides a pulley trough 46 designed to receive thereover a V-type power take-off belt 47.

As best seen in Fig. 2, the inner faces of the housing side walls 23 and 28 are covered with rubber disks 50 which form cushioning means for a pair of opposed friction disks 51, the disks 50 and 51 extending radially outwardly along the converging wall portions 24 and 29 of the housing. The various disks 50 and 51 are held in their centrallized position by virtue of their dished configuration and their nested arrangement with the adjacent parts of the clutch plates and the housing walls.

Disposed within the housing walls and interposed between the two friction disks 51 are a pair of clutch plates 52 in the form of generally circular metal disks of dished configuration having laterally turned inner rim portions 53 which provide a wide hub portion surrounding hexagonal openings 54 centrally formed in the plates. The outer peripheral regions of the clutch plates 52 are inclined as at 55 so that these regions converge toward each other. The clutch plates 52 are capable of axial sliding movement on the hexagonal enlargement 17 of the quill 13 and the plates are constrained to follow the rotational movements of the quill due to the close interfitting of the enlargement 17 within the hexagonal openings 54.

Disposed within the clutch housing and interposed between the two clutch plates 52 is a centrifugal clutch operating member 60 in the form of a length of flat spring wire helically wound and shaped into the form of a ring, the ends of the wire being suitably joined together to provide a continuous winding. As shown in Fig. 4, the wire from which the helical spring is formed is rectangular in cross section. When the shaft 10 and quill 13 are rotating at low speeds below that for which the clutch is intended to operate, the circular spring 60 will be in a retracted condition and thereby relieve its wedging pressure against the opposed converging faces of the portions 55—55 of the clutch plates 52, 53. This close nesting of the adjacent convolutions of which the spring is made of rectangular stock provides maximum centrifugal mass for any given cross sectional diameter of the spring.

With the shaft and quill rotating at speeds below that for which the clutch is designed to operate, and with the spring 60 contracted as described above, the free floating clutch plates 52, friction disks 51 and cushioning members 50, will be disengaged from the opposed inner faces of the housing side walls and, although the clutch plates 52 will turn with the quill 13, no torque will be applied to the housing assembly so that the clutch will remain disengaged and no motion will be imparted to the driven pulley 34 or the belt 47.

Upon acceleration of the shaft 10, quill 13 and clutch plates 52 in unison, the circular spring 60 will, due to its floating contact with the inner opposed faces of the clutch plates 52, rotate about the central axis of the clutch and gather speed and, in doing so, it will gradually expand due to the action of centrifugal force acting on the various increments of the mass of the spring. Such radial expansion of the spring 60 will force the flat outer surfaces of the individual coils into engagement with the inclined outer peripheral regions of the clutch plates 52 and spread the plates apart and cause them to bind against the friction disks 51 which, in turn, will force the backing or cushion disks 50 into engagement with the opposed inner surfaces of the side walls of the clutch housing to translate the rotary motion of the clutch plates 52 into rotary motion of the entire clutch housing so that all of the clutch parts will become locked or engaged and will be caused to rotate in unison.

It is to be noted at this point that the outward pressure exerted by the circular spring 60 on the two clutch plates and the consequent oppositely directed forces applied by the plates to the housing side walls is completely assimilated by the housing structure itself and engagement of the clutch parts thus applies no unbalanced force on the housing in either longitudinal direction. For this reason special thrust bearings are not required at the sides of the housing and the two thrust washers 43 and 44 being merely inexpensive units designed to center the housing on the quill 13 longitudinally.

Upon deceleration of the shaft 10, quill 13, clutch plates 52 and spring 60, the inherent resiliency of the spring will cause it to contract uniformly radially and become withdrawn from its clutching engagement with the inclined regions 55 of the clutch plates 52 to thus permit the plates to move inwardly toward each other on the hexagonal enlargement 17 of the quill 13 and disengage the clutch parts.

It is to be further noted that because of the fact that the outer sides of the various spring convolutions present truly cylindrical surfaces to the opposed faces of the clutch plates and which are tangent to the plane of the converging outer peripheral regions 50 of the latter, a comparatively large area of face-to-face contact between the circular spring and clutch plates 52 is obtained, thus producing a more positive spreading action between the plates so that the latter will be forced tightly against the inner opposed surfaces of the housing walls.

As previously stated, the entire clutch assembly may be reversed upon the motor drive shaft 10 by the simple expedient of removing the knock-out plug 20 and inserting the shaft into the central bore of the quill 13 through the opening 19 in the end plate 18. In this manner the direction of rotation of the clutch housing and its associated take-off pulley will be reversed. It will be understood, of course, that the entire motor and shaft is turned end to end while the position of the clutch assembly remains unchanged.

I claim:

1. A centrifugal clutch mechanism comprising, in combination, a central rotary driving member, a clutch housing rotatably journalled on said driving member for free relative rotation with respect thereto, and having inner side faces constituting rigid, non-yielding, annular clutch faces, a pair of annular clutch plates disposed within said housing and slidably keyed to said driving member for rotation in unison therewith, said plates each having a friction surface thereon in opposition to one of said clutch faces, a friction disk disposed between each friction surface and its adjacent clutch face on the housing, said clutch plates being movable axially in opposite directions from retracted positions wherein the friction disks are out of effective driving contact with said clutch faces to advanced positions wherein said friction disks are compressed between the clutch plates and clutch faces to establish a friction drive from the plates to the housing through said friction disks, radially shiftable means responsive to the action of centrifugal forces disposed within said housing between said clutch plates and movable from an inner retracted position to an outer advanced position when a predetermined speed of rotation has been attained by said driving member and clutch plates, and cam means positioned in the path of movement of said radially shiftable means for forcing said clutch plates to their advanced positions upon outward movement of said radially shiftable means.

2. A centrifugal clutch mechanism according to claim 1 characterized in that said radially shiftable means is a spiral toric spring forming an expandable ring.

3. A centrifugal clutch mechanism as defined in claim 1 characterized in that said cam means is the outer marginal portions of the opposed clutch plates inclined to converge toward each other.

4. In a centrifugal clutch mechanism, the combination set forth in claim 3 wherein said spring is formed of spring wire material of rectangular cross-section wound to present flat faces for contact with said inclined marginal portions of the clutch plates.

5. A centrifugal clutch mechanism according to claim 1 characterized by the provision of a resilient backing disk disposed between each friction disk and its adjacent clutch face for increasing the clutching engagement between the clutch plates and the rotatable housing.

6. In a centrifugal clutch mechanism, in combination, a central rotary driving member, a clutch housing rotatably journalled on and surrounding said driving member for free relative rotation with respect thereto, said housing being formed with a pair of internal, opposed, spaced, rigid, annular clutch faces, a pair of annular clutch plates disposed within said housing and slidably connected to said driving member for rotation in unison therewith, said plates each having a friction surface thereon in opposition to one of said clutch faces, a friction disk disposed between each friction surface and its adjacent clutch face on the housing, a resilient backing disk disposed between each friction disk and its adjacent clutch face, said clutch plates being movable in opposite directions from retracted positions wherein the friction disks and backing disks are disengaged to advanced positions wherein said disks are compressed between the friction surfaces on the clutch plates and the clutch faces on the housing, said clutch plates having outer peripheral regions which are inclined away from the plane of the plates and converge toward each other, a helically wound toric spring of substantial mass disposed within the housing between the converging portions of the clutch plates and surrounding said driving member, the overall width of said toric spring being adapted to provide wedging frictional engagement with inclined portions of said clutch plates to force the latter outwardly away from each other to their advanced clutch-engaging positions.

7. In a centrifugal clutch mechanism as defined in claim 6 characterized in that said housing comprises two complementary sections of dished configuration in cross-section and having overlapping marginal flanges secured together.

8. In a centrifugal clutch mechanism as defined in claim 7 characterized in that one of said sections of the housing is provided with a hub portion for rotatably mounting the housing on said driving member and the other section of the housing is supported clear of the driving member.

9. In a centrifugal clutch mechanism as defined in claim 7 characterized in that a portion of said driving member is provided with a plurality of flat surfaces and in that said clutch plates are mounted on the last mentioned portion of the driving member to effect said slidable connection.

References Cited in the file of this patent

UNITED STATES PATENTS

| | | |
|---|---|---|
| 850,981 | Tillotson | Apr. 23, 1907 |
| 1,032,524 | Wiard | July 16, 1912 |
| 1,805,692 | Ferenci | May 19, 1931 |
| 2,235,107 | Kreis | Mar. 18, 1941 |
| 2,260,796 | Burns | Oct. 28, 1941 |
| 2,409,757 | Hetzel et al. | Oct. 22, 1946 |
| 2,491,003 | Elmore | Dec. 13, 1949 |